US006178762B1

(12) United States Patent
Flax (10) Patent No.: US 6,178,762 B1
(45) Date of Patent: Jan. 30, 2001

(54) DESICCANT/EVAPORATIVE COOLING SYSTEM

(75) Inventor: Arthur M. Flax, Denver, CO (US)

(73) Assignee: Ethicool Air Conditioners, Inc., Denver, CO (US)

(*) Notice: Under 35 U.S.C. 154(b), the term of this patent shall be extended for 0 days.

(21) Appl. No.: 09/222,079

(22) Filed: Dec. 29, 1998

(51) Int. Cl.⁷ ........................................ F25D 23/00
(52) U.S. Cl. ........................... 62/271; 62/93; 62/92
(58) Field of Search ............................ 62/271, 92, 93

(56) References Cited

U.S. PATENT DOCUMENTS

| 2,725,729 | 12/1955 | Mills | 62/139 |
| 3,144,901 | 8/1964 | Meek | 165/6 |
| 3,488,971 | 1/1970 | Meckler | 62/3 |
| 3,828,528 | 8/1974 | Weil | 55/388 |
| 4,002,040 | 1/1977 | Munters et al. | 62/121 |

(List continued on next page.)

OTHER PUBLICATIONS

Ashrae Fundamentals Handbook; Chapter 19; "Sorbents and Desiccants"; 1989.
National Renewable Energy Laboratory Technical Report; Ahmad A. Pesaran et al.; Desiccant Cooling: State–of–the–Art Assessment; Oct. 1992.
Ashrae Handbook; I–P Edition; HVAC Systems and Equipment; 1996.
LaRoche Air Systems Inc.; "MegaCool Module"; Jan. 1997.
Advanced Desiccant Cooling & Dehumidification Program; S.J. Slayzak et al.; "Experimental Evaluation of Commercial Desiccant Dehumidifier Wheels"; 1996; http://www.nrel.gov/desiccantcool/wheels.htm.
Ashrae Journal vol. 39, (No. 4) pp. 60–64; Spears et al.; "Field Test Results of a Gas Fired Desiccant Make up Air System on a Wal–Mart Supercenter"; Oct. 1997.
Ashrae Journal; Brian Kovak et al; "The Sanitizing Effects of Desiccant–Based Cooling"; Apr. 1997.
Novelaire Technologies; William A. Belding, Ph.D; "Impact of Evaporative Cooling Technology on Desiccant Based Ventilation Systems"; Aug. 4, 1998; http://www.novelaire.com/descool.htm;.

* cited by examiner

Primary Examiner—William Doerrler
Assistant Examiner—Mark Shulman
(74) Attorney, Agent, or Firm—Sheridan Ross P.C.

(57) ABSTRACT

In accordance with the present invention, a desiccant/evaporative cooling system for providing cool and dry air to an enclosed structure is disclosed. The system includes a desiccant chamber, at least one evaporative cooler, and a heat exchanger. The desiccant chamber intermittently receives and drys a first airstream from the enclosed structure to produce a second airstream. The evaporative cooler(s) receive and cool the second airstream to produce a third airstream at a temperature below a dew point for an ambient airstream. The heat exchanger uses the third airstream for absorbing heat from the ambient airstream to produce a fourth airstream before the fourth airstream is forced into the enclosed structure. Condensate is removed from the ambient airstream on the dry side surface of the heat exchanger. In another embodiment, a method for conditioning an ambient airstream in order to provide cool and dry air to an enclosed structure is disclosed. The ambient airstream is cooled to a temperature approaching the dew point of the ambient airstream to produce a first airstream which is cooler than the ambient airstream. The first airstream is forced into the enclosed structure. The second airstream is removed from the enclosed structure. The second airstream is dried to produce a third airstream. The temperature of the third airstream is reduced with one or more evaporative coolers to produce a fourth airstream. The fourth airstream has a temperature lower than the dew point of the ambient airstream. Heat and condensation is absorbed from the ambient airstream by using the fourth airstream.

29 Claims, 6 Drawing Sheets

U.S. PATENT DOCUMENTS

| | | | |
|---|---|---|---|
| 4,176,523 | 12/1979 | Rosseau | 62/2 |
| 4,461,733 | 7/1984 | Otterbein | 261/153 |
| 4,594,855 | 6/1986 | Gunther | 62/92 |
| 4,708,832 | 11/1987 | Norback | 261/153 |
| 4,719,761 | 1/1988 | Cromer | 62/94 |
| 4,977,753 | 12/1990 | Maisotsenko et al. | 62/121 |
| 4,982,575 | 1/1991 | Besik | 62/271 |
| 5,050,391 | 9/1991 | Tsimerman | 62/94 |
| 5,170,633 | 12/1992 | Kaplan | 62/94 |
| 5,176,005 * | 1/1993 | Kaplan | 62/94 |
| 5,187,946 | 2/1993 | Rotenberg et al. | 62/314 |
| 5,212,956 | 5/1993 | Tsimerman | 62/94 |
| 5,301,518 | 4/1994 | Morozov et al. | 62/305 |
| 5,315,843 | 5/1994 | Morozov et al. | 62/309 |
| 5,349,829 | 9/1994 | Tsimerman | 62/314 |
| 5,453,223 | 9/1995 | Maisotsenko | 261/153 |
| 5,460,004 | 10/1995 | Tsimerman | 62/94 |
| 5,548,970 * | 8/1996 | Cunningham, Jr. et al. | 62/271 |
| 5,653,115 | 8/1997 | Brickley et al. | 62/94 |
| 5,661,983 | 9/1997 | Groten et al. | 62/271 |
| 5,732,562 | 3/1998 | Moratalla | 62/94 |
| 5,758,508 | 6/1998 | Belding et al. | 62/94 |
| 5,758,511 | 6/1998 | Yoho et al. | 62/271 |
| 5,761,915 | 6/1998 | Rao | 62/94 |
| 5,890,370 * | 4/1999 | Belding et al. | 62/271 |
| 6,018,953 * | 2/2000 | Belding et al. | 62/94 |
| 6,018,961 * | 2/2000 | Venture et al. | 62/434 |
| 6,029,467 * | 2/2000 | Moratalla | 62/271 |

Fig. 8  First Mode

Fig. 9  Second Mode

Fig. 10  Third Mode

DESICCANT/EVAPORATIVE COOLING SYSTEM

FIELD OF THE INVENTION

The present invention relates to air conditioners, and in particular, to air conditioners which utilize both desiccants and evaporative coolers.

BACKGROUND INFORMATION

Evaporative coolers, both direct and indirect, are well known in the art. Evaporative cooling is generally considered energy efficient because fans, rather than more energy intensive pumps used in traditional vapor compression systems, power the cooling processes. In dry desert and high altitude climates, direct evaporative cooling alone provides energy efficient cooling in popular commercially available products, commonly referred to as "swamp coolers." In humid regions, however, these direct evaporative coolers are less effective as they will not appreciably lower the conditioned air temperature and they increase room humidity when the room air is already laden with moisture.

Direct evaporative coolers remove heat while increasing the moisture in the air. In general terms, direct evaporative cooling dissipates the heat in air, using the heat energy in the air to evaporate water. The energy consumed to evaporate the water in evaporative coolers reduces the air temperature. In direct evaporative coolers, a fan is used to blow warm outside air through a water absorbent medium such as an open cell foam, corrugated cardboard or wood filings. When the warm air passes the water absorbent medium, the water evaporates, causing the air to become cooler, but more humid. This process is called adiabatic cooling because no energy is lost. This loss of sensible heat energy (generally expressed as temperature) causes the vapor pressure in the air (generally expressed as humidity) to rise. The energy that causes the humidity to rise is called latent heat energy and the reduction in sensible heat equals the increase in latent heat.

When hot, dry air enters the direct evaporative cooler, it can only be cooled to the wet-bulb temperature. As air is cooled, the relative humidity increases. When air is cooled to the point where it will hold no more water (i.e., 100 percent relative humidity) that temperature is referred to as the dew point. The wet-bulb temperature is the lowest temperature that can be measured on a water absorbent surface when air is flowing past at high velocity. The dew point temperature is often well below that of the wet-bulb temperature, particularly when the air is hot and dry. The dew point is the temperature at which liquid within the air will condense.

Indirect evaporative cooling extends the usefulness of evaporative cooling to more humid climates. In an indirect evaporative cooler, the evaporative cooling process is separated from the occupants of the building or enclosed structure by a heat exchanger that conducts heat. On one side (hereinafter, the "wet" side) of an indirect evaporative cooler, contained within the heat exchanger, a first stream of air blows through a water filled medium or air spray, lowering air temperature and increasing humidity in a way similar to the direct evaporative cooler. On the other side of the cooler (hereinafter, the "dry" side), a second stream of warm air blows past the heat exchanger, cooling the second stream without adding moisture to the air. In this way, humid air can pass the wet side of the heat exchanger without changing the moisture content of the air cooled on the dry side of the heat exchanger. In other words, indirect evaporative coolers work by dividing a first air flow into a first and second portion, then by directing the first portion through one or more wet internal pre-cooling stages, lowering the temperature within the last stage of the cooler to a level that approaches the dew point of the air at entry. Heat in the air on the dry side of the cooler is transferred to the wet side of the cooler, such that the temperature of the air leaving the dry side of the cooler also approaches the dew point temperature of the air at entry.

Indirect evaporative cooling is more effective than direct evaporative cooling in more humid climates because indirect methods do not add moisture to the air. However, as described above, relative humidity increases when air is cooled so there is a limit to the effectiveness of indirect evaporative cooling. This is especially true in more humid climates.

Evaporative coolers typically employ moisture absorbing surfaces that must be cleaned or replaced at regular intervals. Indirect evaporative cooling systems are deficient in providing access to such moisture absorbing surfaces for service or replacement. Many systems have a limited life span due to the deteriorating effects of water on the moisture absorbing surfaces and the lack of service access to such surfaces. Accordingly, a need exists for indirect evaporative coolers to be easily serviceable.

Desiccant air drying techniques, used in concert with evaporative cooling or existing vapor compression systems, are used to provide deep dehumidification in certain applications where this is desirable. Supermarkets, for example, have employed desiccant air drying as it is seen as beneficial for reducing spoilage in perishable food storage. However in practice, these systems have yet to achieve efficiencies substantially greater than existing vapor compression systems. This is largely due to the mechanical complexity of the complete system and the continuous energy demand of the desiccant and enthalpy wheels common in such systems.

Conventional desiccant/evaporative cooling systems also have a disadvantage in that they are relatively large and expensive, due to their mechanical complexity. For example, a typical desiccant wheel alone may be four feet in diameter and one foot in depth. This drawback limits the acceptance of conventional systems in markets where initial cost and package size is a major factor, such as residential and transportation markets.

Theoretical efficiencies for air conditioners which use desiccant dehumidification in combination with evaporative cooling have been estimated at up to five times that of conventional vapor-compression air conditioning systems. Additionally, desiccant/evaporative cooling systems offer an advantage over vapor-compression systems in that they continuously pass a large volume of air through an enclosed structure resulting in more fresh air being introduced into an enclosed structure. Accordingly, the air quality is improved along with efficiency.

Figure 1:
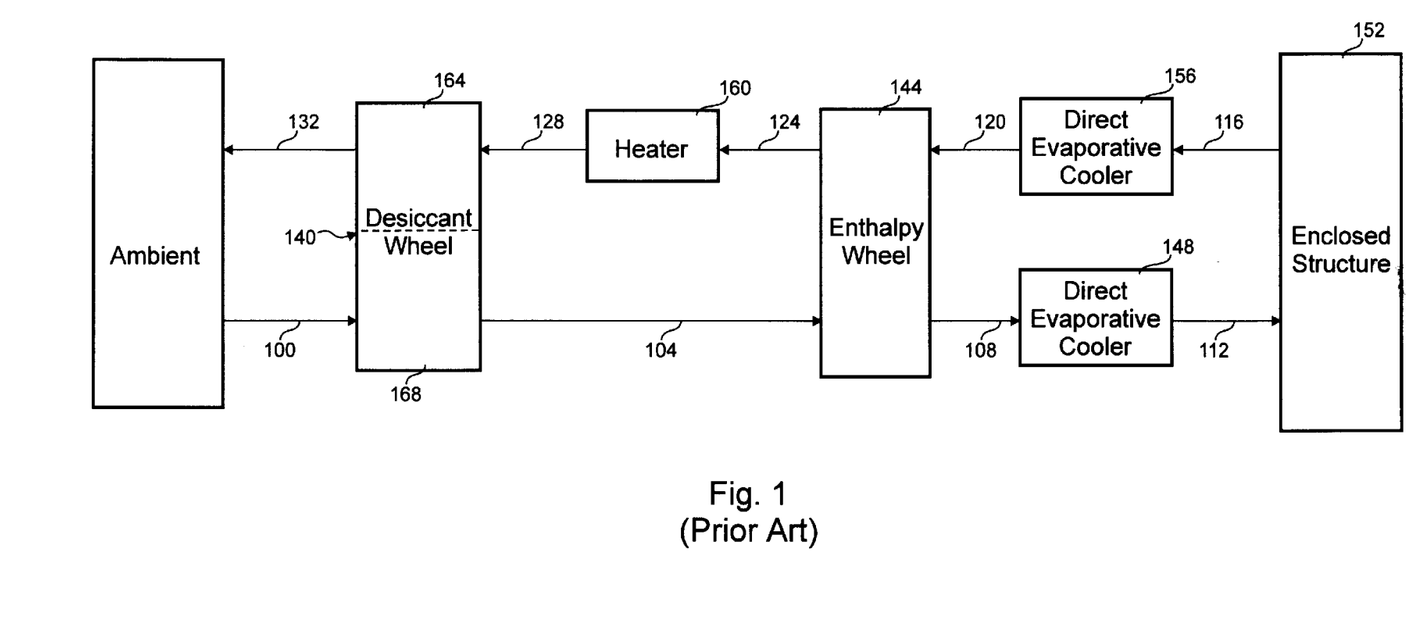
FIG. 1 is a block diagram which schematically depicts an a conventional Pennington cycle desiccant/evaporative cooling system.
Figure 2:
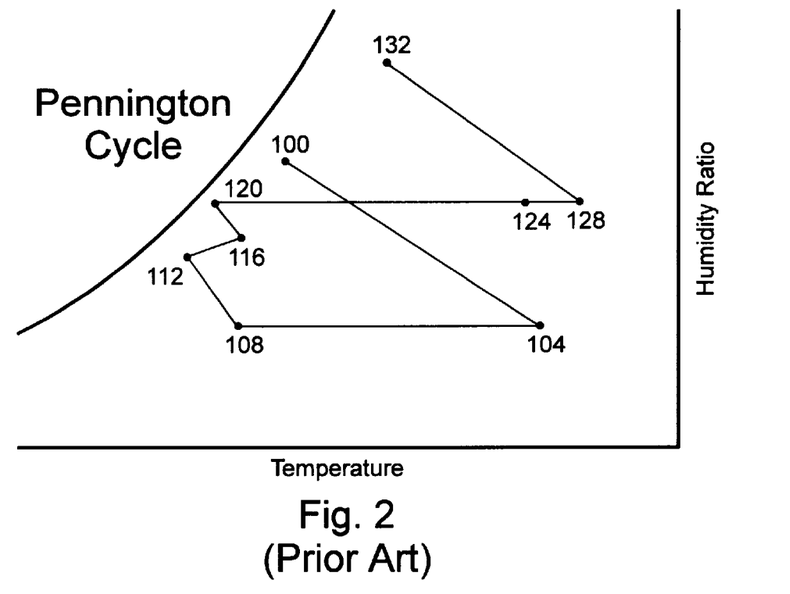
FIG. 2 is a psychrometric chart showing changes to the airflow throughout the conventional desiccant/evaporative cooling system of FIG. 1.

A basic psychrometric cycle for desiccant/evaporative cooling systems was devised by Pennington and the cycle is known as the Pennington or ventilation cycle (see FIG. 2). With reference to FIGS. 1 and 2, the cycle involves drying an incoming ambient airstream 100 with a desiccant wheel 140 to produce a second airstream 104 which is dryer and hotter. The second airstream 104 is then cooled with an air to air heat exchanger 144 to produce a third airstream 108. Typically, the air-to-air heat exchanger 144 is implemented with a rotating wheel assembly, known in the art as an enthalpy wheel. After cooling in the heat exchanger 144, the third airstream 108 is passed through a first direct evaporative cooler 148 to cool and humidify the third airstream to produce a fourth airstream 112 which is introduced into an enclosed structure 152. In this way, cool air is introduced into the enclosed structure 152.

The fourth airstream 112 is heated by such sources as solar radiation striking the exterior of the structure and/or the presence of people and humidified by such sources as cooking, industrial activities and/or people within the enclosed structure 152 to generate a fifth airstream 116. The fifth airstream 116 passes through a second direct evaporative cooler 156 where it is cooled and humidified to produce a sixth airstream 120. The sixth airstream is passed though the air-to-air heat exchanger 144 which cools the second airstream 104. In the process of cooling the second airstream 104, the sixth airstream 120 is heated to produce a seventh airstream 124. In a heater 160, the seventh airstream 124 is heated to produce an eighth airstream 128. The eighth airstream 128 is used to regenerate one side of the desiccant wheel 140 before being exhausted as a ninth airstream 132.

Conventional Pennington cycle desiccant/evaporative cooling systems typically utilize a continuously-regenerated desiccant wheel 140 to remove latent heat from a confined area, together with one or more evaporative coolers 148 to remove heat and humidify. In other words, the incoming airstream is first dehumidified and then cooled which extends the area in which an evaporative cooler is practical to include more humid climates. The desiccant wheel 140 is generally divided into a first portion 168 which removes humidity from incoming ambient air and a second portion 164 which is regenerated by heating the desiccant with a warm airstream 128. While the desiccant wheel 140 rotates, the first portion 168 is constantly changing so that it is regenerated in the second portion 164. As those skilled in art can appreciate however, rotating the desiccant wheel 140 to constantly regenerate the desiccant consumes energy. Further, use of the enthalpy wheel as the air-to-air heat exchanger 144 consumes additional energy. Consumption of energy in this way, reduces the efficiency of desiccant/evaporative cooling systems.

In summary, it would be desirable to develop a desiccant/evaporative cooling system which: (1) improves upon the Pennington cycle to more efficiently cool an enclosed structure, (2) does not use desiccant or enthalpy wheels because of their excessive energy demands, (3) allows for easy serviceability of the evaporative coolers, and (4) is not mechanically complex such that applications which require less space may use the cooling system.

SUMMARY OF THE INVENTION

In accordance with a first embodiment of the present invention, a desiccant/evaporative cooling system for providing cool and dry air to an enclosed structure is disclosed. The system includes a desiccant chamber, at least one evaporative cooler, and a heat exchanger. The desiccant chamber intermittently receives and drys a first airstream from the enclosed structure to produce a second airstream. The evaporative cooler(s) receive and cool the second airstream to produce a third airstream at a temperature below a dew point for an ambient airstream. The heat exchanger uses the third airstream for absorbing heat from the ambient airstream to produce a fourth airstream before the fourth airstream is forced into the enclosed structure. Condensate is removed from the ambient airstream on the dry side surface of the heat exchanger.

In another embodiment, a method for conditioning an ambient airstream in order to provide cool and dry air to an enclosed structure is disclosed. The ambient airstream is cooled to a temperature approaching the dew point of the ambient airstream to produce a first airstream which is cooler than the ambient airstream. The first airstream is forced into the enclosed structure. The second airstream is removed from the enclosed structure. The second airstream is dried to produce a third airstream. The temperature of the third airstream is reduced with one or more evaporative coolers to produce a fourth airstream. The fourth airstream has a temperature lower than the dew point of the ambient airstream. Heat and condensation is absorbed from the ambient airstream by using the fourth airstream.

Based upon the foregoing summary, a number of important advantages of the present invention are readily discerned. A new psychrometric cycle is introduced which improves upon the Pennington cycle to closely approach theoretical efficiencies for desiccant/evaporative cooling systems. The present system does not use desiccant or enthalpy wheels because their excessive energy demands reduce efficiency. The unique design is not mechanically complex and allows for easy serviceability of the evaporative coolers. The simplicity of the design accommodates applications which require less space than consumed by convention desiccant/evaporative cooling systems.

Additional advantages of the present invention will become readily apparent from the following discussion, particularly when taken together with the accompanying drawings.

DETAILED DESCRIPTION

The present invention operates on a new psychrometric control cycle. In one embodiment, a cool airstream is used to generally cool ambient air below its dew point before entry into an enclosed structure. The cool airstream is generated by using previously cooled air from the enclosed structure which is subjected to desiccant drying and two stages of evaporative cooling. Since the ambient air is cooled below its dew point, moisture condenses on the outer surface of the indirect evaporative cooler. This condensation is recycled to provide moisture to the evaporative coolers. As a result, the air entering the enclosed structure is both dryer and cooler than ambient air so that the desiccant/evaporative cooling system is suited for the most humid of climates.

Figure 3:
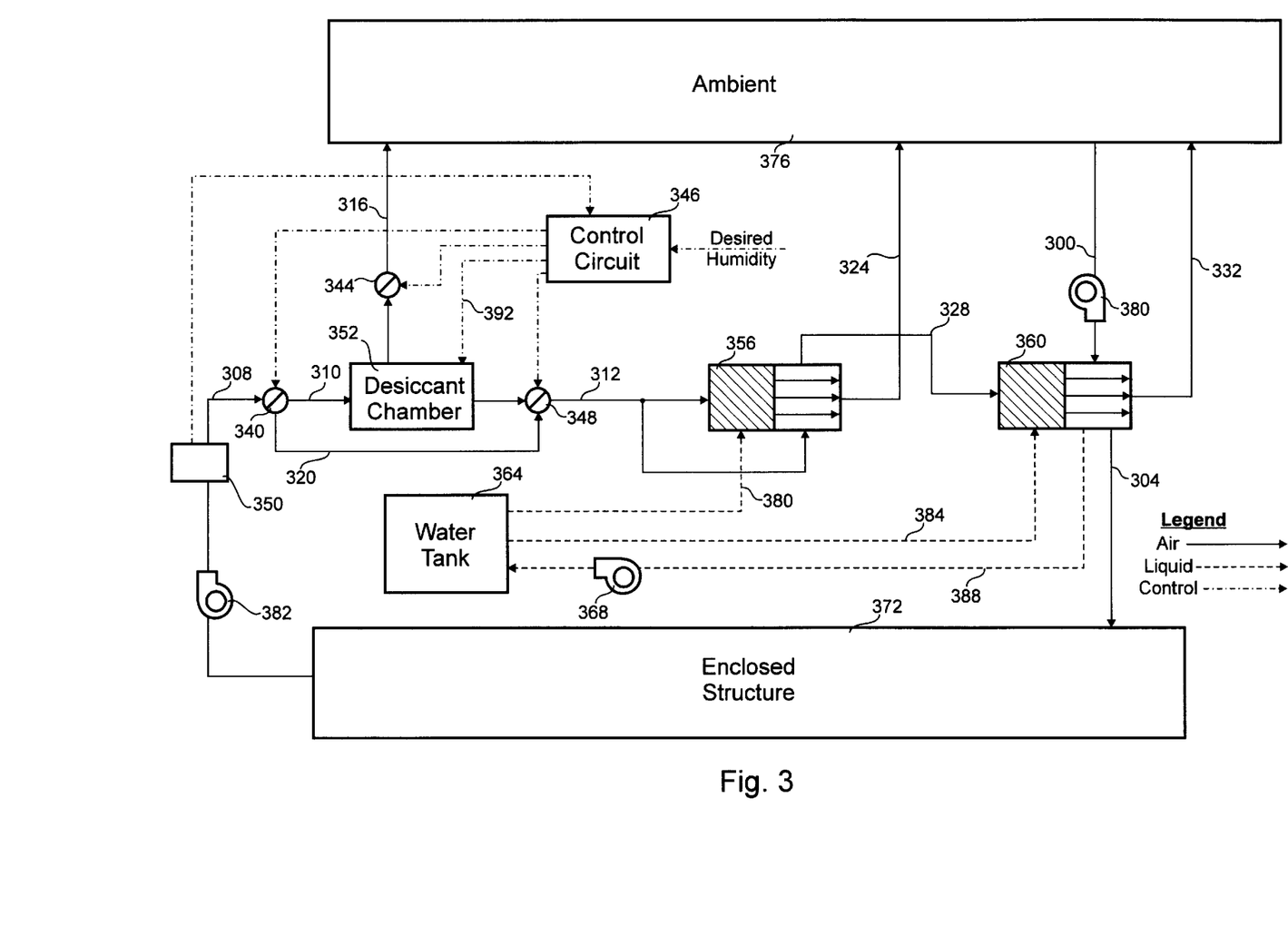
FIG. 3 is a block diagram which schematically depicts an embodiment of the present invention.

With reference to FIG. 3, an embodiment of the current desiccant/evaporative cooling system is shown in block diagram form. The cooling system includes first through third dampers 340, 344, 348, a control circuit 346, a desiccant chamber 352, a first indirect evaporative cooler 356, a second indirect evaporative cooler 360, a water tank 364, a water pump 368, a first fan 380, and a second fan 382. Dampers 340, 344, 348 are used to direct airstreams through the system under the management of the control circuit 346.

The desiccant/evaporative cooling system can operate in at least three modes by appropriately controlling the dampers 340, 344, 348. The third airstream 308 is divided according to the sole table amongst a fourth through seventh airstreams 310, 316, 320, 312 as directed by the dampers 340, 344, 348. In a first mode, the first damper 340 passes all of a third air flow 308 into the desiccant chamber 352 and past the third damper 348. While in a regeneration or a second mode, approximately 90% of the third airstream 308 bypasses the desiccant chamber 352 and only approximately 10% of the third airstream 308 enters the desiccant chamber 352 to remove any moisture from the heated desiccant. In a third mode, the third airstream 308 bypasses the desiccant chamber 352 altogether. Alternatively in the third mode, the third airstream 308 may be allowed to continue to pass through a saturated desiccant chamber 352 as it will have no effect on the temperature and humidity condition of the third airstream 308 because the saturated desiccant is no longer able to adsorb additional moisture. Generally, the third mode is utilized when the third airstream 308 is sufficiently dry so as to not require any drying in the desiccant chamber 352.

TABLE

Division of the Third Airstream 308

| Air Flows | First Mode (Cool/Dry) | Second Mode (Regeneration) | Third Mode (Cool Only) |
| --- | --- | --- | --- |
| Fourth Airstream 310 | 100 % | 10 % | 0 % |
| Fifth Airstream 316 | 0 % | 10 % | 0 % |
| Sixth Airstream 320 | 0 % | 90 % | 100 % |
| Seventh Airstream 312 | 100 % | 90 % | 100 % |

To configure the dampers 340, 344, 348 for each of the modes, the control circuit 346 uses predetermined algorithms, input from the humidity sensor 350 and a desired humidity set by the user. Commonly available actuators, utilizing means such as electrical, hydraulic or pneumatically initiated action are activated by the control circuit 346 to operate the dampers.

The humidity sensor 350 measures the moisture content of the third airstream 308 from the enclosed structure 372. Input from the humidity sensor 350 is used to determine when the desiccant is saturated (i.e., when the regeneration of second mode is necessary) and when drying is unnecessary (i.e., the third mode is adequate).

By knowing the amount of moisture in the third airstream 308 and utilizing predetermined factors such as the known moisture capacity of the desiccant, rate of moisture adsorption and airflow rate, the control circuit 346 algorithm can determine when the desiccant has become saturated so that the second mode is necessary. Alternatively, algorithms which rely only on the measurement of the rate and direction of humidity changes, as sensed by humidity sensor 350 within the enclosed structure may also be utilized to initiate the second mode.

The amount of moisture in the third airstream 308 may indicate to the control circuit 346 that the dryness of the air does not warrant the energy spent operating the desiccant chamber 352 such that the system may operate in the second mode. The humidity may be programmable by the user so that the desired humidity would affect the algorithms in the control circuit 346.

With reference to FIGS. 3–6, the block diagram for the desiccant/evaporative cooling system and corresponding psychrometric charts are shown for each of the three modes of operation. Fresh ambient air 376 forming a first airstream 300 is drawn into the desiccant/evaporative cooling system by the first fan 380. The first airstream 300 is passed through the dry side of the second indirect evaporative cooler 360 where the first airstream 300 is generally cooled below its dew point. It should be noted, the dry side of the second indirect evaporative cooler 360 adds no moisture to the first airstream 300 to produce a second airstream 304. Additionally, since the wet side of the indirect evaporative cooler 360 passes air cooler than the dew point of the first airstream, moisture is removed from the first airstream 300 as condensation. In this way, a second airstream 304 is introduced into the enclosed structure which is cooler and dryer than the ambient air 376.

To provide cool air to the wet side of the second indirect evaporative cooler 360, a third airstream 308 is removed from the enclosed structure 372. While operating in a first mode (see FIG. 4), both desiccants and evaporative cooling are utilized to cool the third airstream 308. The entire third airstream 308 is forced by the second fan 382 and the dampers 340, 344, 348 through the desiccant chamber 352 to produce the seventh airstream 312. The seventh airstream 312 is generally warmer and dryer than the third airstream 308. The seventh airstream 312 is forced into the first indirect evaporative cooler such that approximately half enters the wet side to provide cooling to the other half which enters the dry side to produce an eighth and a ninth airstreams 324, 328. The division between the wet and dry side may be optimized so that each side may receive between 20–50% of the total airflow. The eighth airstream 324, which passed through the wet side, is exhausted after cooling the dry side of the first indirect evaporative cooler 356.

Figure 4:
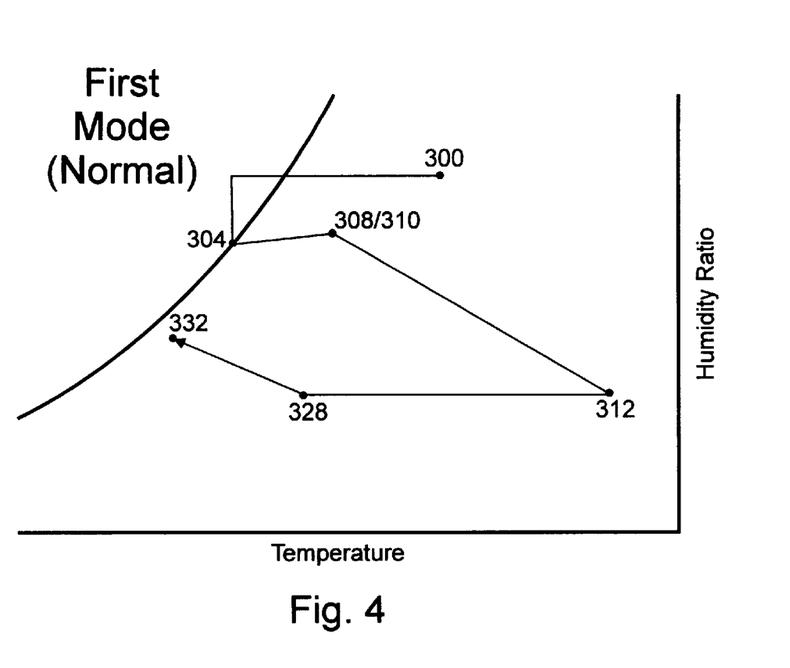
FIG. 4 is a psychrometric chart showing changes to the airflow throughout the desiccant/evaporative cooling system of FIG. 3 while operating in a first mode which both cools and drys.
Figure 5:
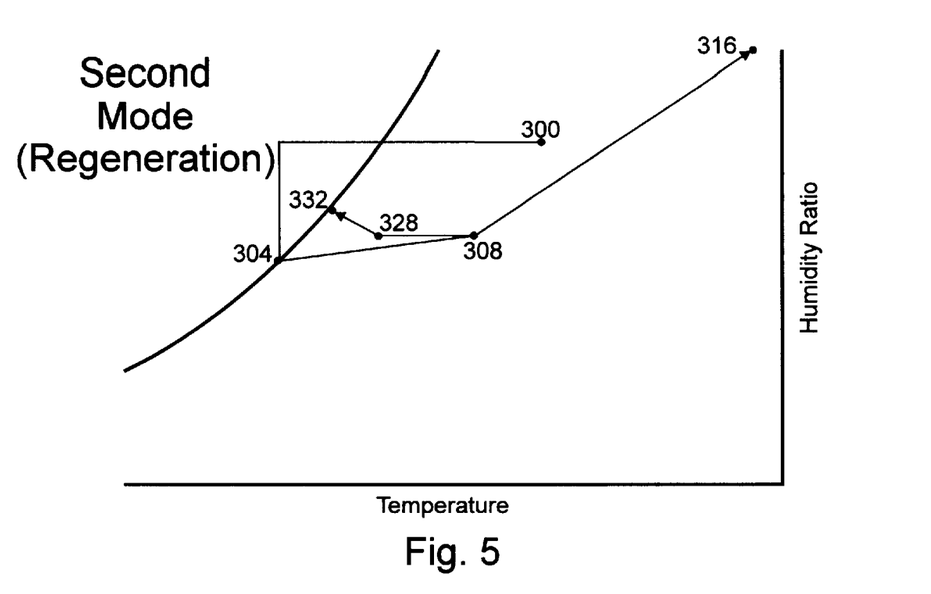
FIG. 5 is a psychrometric chart showing changes to the airflow throughout the desiccant/evaporative cooling system of FIG. 3 while operating in a second mode which regenerates the desiccant while cooling.
Figure 6:
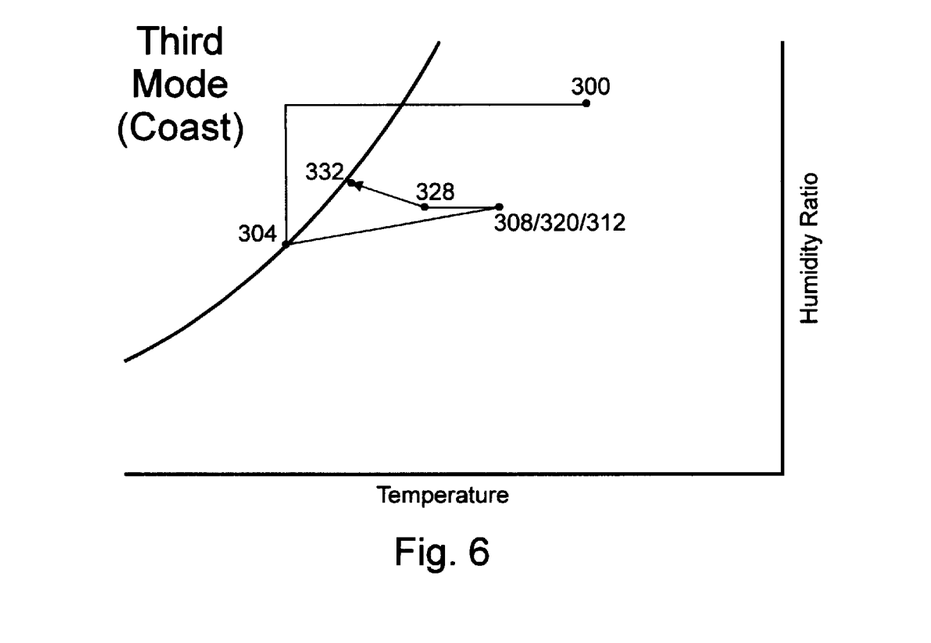
FIG. 6 is a psychrometric chart showing changes to the airflow throughout the desiccant/evaporative cooling system of FIG. 3 while operating in a third mode which only cools without desiccant drying.

The ninth airstream 328 is generally cooler than the seventh airstream 312 and has the same moisture content. All of the ninth airstream 328 is passed into the wet side of the second indirect evaporative cooler 360 to further cool the ninth airstream 328 and absorb heat from the first airstream 300 passing through the dry side of the second indirect evaporative cooler 360. The ninth airstream 328 entering the wet side of the second indirect evaporative cooler 360 is cooled to a temperature close to the dew point of the seventh airstream 312 which is generally well below the dew point of the first airstream 300. Because of this, condensation forms on the heat exchange surfaces of the dry side of the second indirect evaporative cooler 360.

Operation in the second or regenerative mode (see FIG. 5) is required to periodically remove moisture from the desiccant chamber 352 so that the desiccant may adsorb moisture once again. To remove the moisture, the desiccant is heated by a heating source 392 to a predetermined temperature and approximately 10% of the third airstream 308 passes over the heated desiccant to exhaust the released moisture as a fifth airstream 316. The dampers 340, 344, 348 are configured accordingly. While regeneration is taking place, the remaining approximately 90% of the third airstream 308 bypasses the desiccant chamber 352 to be cooled by the first and second indirect evaporative coolers 356, 360. In this way, the desiccant may be regenerated while the enclosed structure is still being cooled. Generally, the regeneration in the second mode takes considerably less time than the time consumed in the first mode. To shorten the regeneration period, the design of the desiccant chamber could include a provision for additional desiccant surface area, increasing heat transfer to the desiccant, and/or lowering the mass of heat transfer surfaces in communication with the desiccant.

The third or coasting mode (see FIG. 6) is utilized when the third airstream 308 is determined by the humidity sensor 350 to be adequately dry. In some very dry climates, the ambient air 376 is so dry that additional drying in the desiccant chamber 352 is rarely necessary. The humidity sensor 350 determines the moisture content of the third airstream 308 and signals the control circuit 346 accordingly. If the desired humidity set by the user is achieved, the control circuit would command the dampers 340, 344, 348 so that substantially all the third airstream bypasses the desiccant chamber 352. As those skilled in the art can appreciate, only using the desiccant chamber when necessary increases the energy efficiency of the desiccant/evaporative cooling system. If sources in the enclosed structure 372 raise the humidity beyond the desired humidity, the control circuit 346 will change to the first mode once again to dry the air. These sources include the presence of people, opening of windows and doors, cooking, industrial processes, etc. By cycling through the three modes of operation, the energy efficiency of the desiccant/evaporative cooling system is improved while maintaining a desired humidity.

The water tank 364 stores the excess water or fluid needed for operation. Gravity or pumps are used to transport water to the first and second indirect evaporative coolers 356, 360 and from the second evaporative cooler 360. In the embodiment depicted in FIG. 3, water flows by gravity to a drip pan beneath the wet side of the first and second indirect evaporative coolers 356, 360 and water is recycled from the drip pan beneath the dry side of the second evaporative cooler 360 by way of a pump 368. As mentioned above, condensation from the dry side of the second evaporative cooler 360 is produced because the temperature produced by the wet side is generally below the dew point of the airstream 300 entering the dry side. By recycling the condensation in this way, the filling of the water tank 364 may be performed less frequently and cooling in the first and second evaporative coolers 356, 360 may be increased.

When directed by the dampers 340, 344, 348 latent heat energy in the third airstream 308 is converted to sensible heat by the desiccant chamber 352. The desiccant is contained in an insulated desiccant chamber 352 and is mounted by adhesive and/or mechanical means in a manner that exposes maximum of the desiccant surface area to the incoming airstream 310 with minimal restriction upon the air flow. Such methods well known in the art as parallel strips or staggered parallel strips with desiccant bonded by mechanical or adhesive means, may be used. Such a configuration is beneficial in both regeneration and dehumidification of the airstream. The desiccant may be any heat-regenerative, moisture-attracting material such as silica gel, molecular sieves and hydratable salts including desiccant liquids such as glycols and lithium chloride. Regeneration heat may be applied to the desiccant by any heat transfer method, which may including thermal conduction, radiation and/or convection. For example, the desiccant could be heated by any combination of direct thermal conduction from an electrical resistance heater, radiation from a heat lamp and/or convection from a natural gas combustion heated airflow.

While passing through the desiccant chamber 352, moisture is adsorbed by the desiccant and latent heat energy in the airstream is converted to sensible heat energy, such that the air temperature of the seventh airstream 312 is significantly higher than the temperature of the fourth airstream 310 entering the desiccant chamber 352. The configuration of the desiccant is such that the rate of adsorption during the first mode has been previously determined. The limit of the heat of adsorption is determined after considering the most demanding operating conditions to which the system may be exposed. For example, if it is determined that the air conditioner will see as its maximum, ambient air conditions which never exceed 100° F. with a humidity ratio of 240 grains/pound (34.29 grams/kilogram), it may be determined that it is desirable to limit the air drying capacity of the desiccant chamber to 80 grains/pound (11.43 grams/kilogram). According to this example, when the airstream 310 enters the desiccant chamber 352 at 100° F., with a humidity ratio of 240 grains/pound (34.29 grams/kilogram), it will leave with a temperature at 150 degrees F., with a humidity ratio of 160 grains/pound (22.86 grams/kilogram).

The air and liquid are propelled throughout the desiccant/evaporative cooling system by way of the pump 368 and the fans 380, 382. Other embodiments could place the pumps and fans in different locations and still adequately propel the liquid and air. However, it is preferred to place the fans 380, 382 respectfully before and after the enclosed structure 372 to propel the second and third airstreams 304, 308. Additionally, a common motor could be used to propel the fan blades in a way that reduces energy consumption.

To provide more or less fresh air to the enclosed structure 372, the fan speeds may be increased or decreased accordingly. As can be appreciated by those skilled in the art, controlling the air flow rate also allows for regulation of the temperature and relative humidity. For example, increasing the flow rate will decrease the temperature difference between the airstream 304 and temperature within the enclosed structure 372. However, increasing the air flow rate excessively will decrease the heat transfer to the airstream 304 and the amount of moisture removed by condensation. For this reason, those skilled in the art will also appreciate the importance of matching heat exchanger cooling capacity with the anticipated sensible and latent heat load of the enclosed structure.

Figure 7:
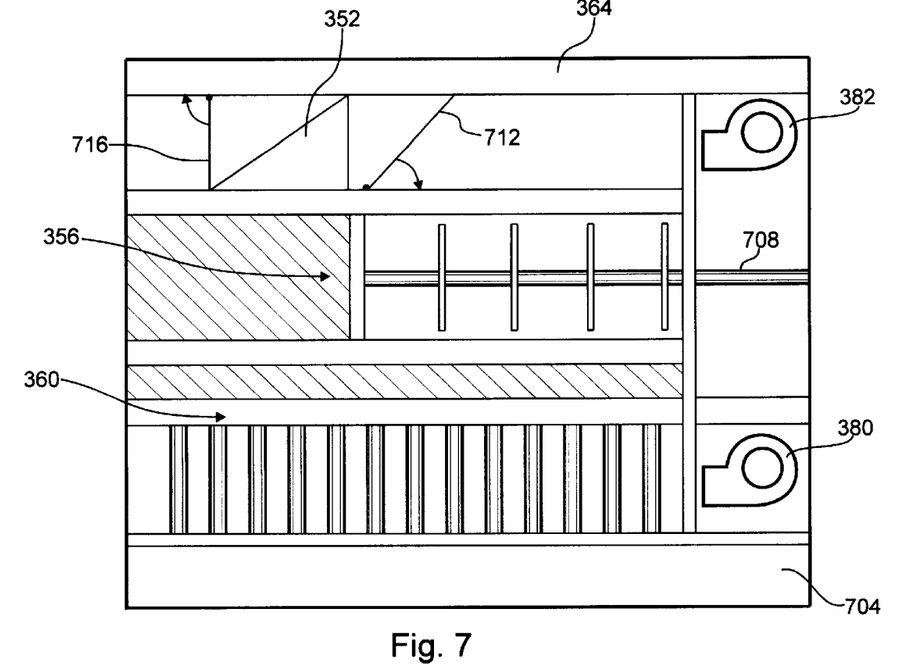
FIG. 7 is a side sectional view which schematically depicts an embodiment of the desiccant/evaporative cooling system.

With reference to FIG. 7, an embodiment of the desiccant/evaporative cooling system is schematically shown. The compact implementation of the system allows for placement of the system in a window opening or other small orifice in the enclosed structure 372. FIG. 7 shows a condensation collection pan 704, a precooling heat exchanger 708, a first damper 712, a second damper 716, the desiccant chamber 352, the first indirect evaporative cooler 356, the second indirect evaporative cooler 360, the water tank 364, a first fan 380, and a second fan 382. The condensation collection pan 704 collects moisture removed from the first airstream 300. Condensation is produced because the second indirect evaporative cooler 360 can cool the dry side below the dew point of the ambient air in the first airstream 300. To precool the third airstream 308, the heat exchanger 708 uses exhaust from the first indirect evaporative cooler 356 which takes advantage of the fact that the exhaust is generally cooler than the third airstream 308, in particular during the second and third modes of operation. The first and second dampers 712, 716 are hinged on one end to allow redirection of the airstream passing therethrough.

Figure 8:
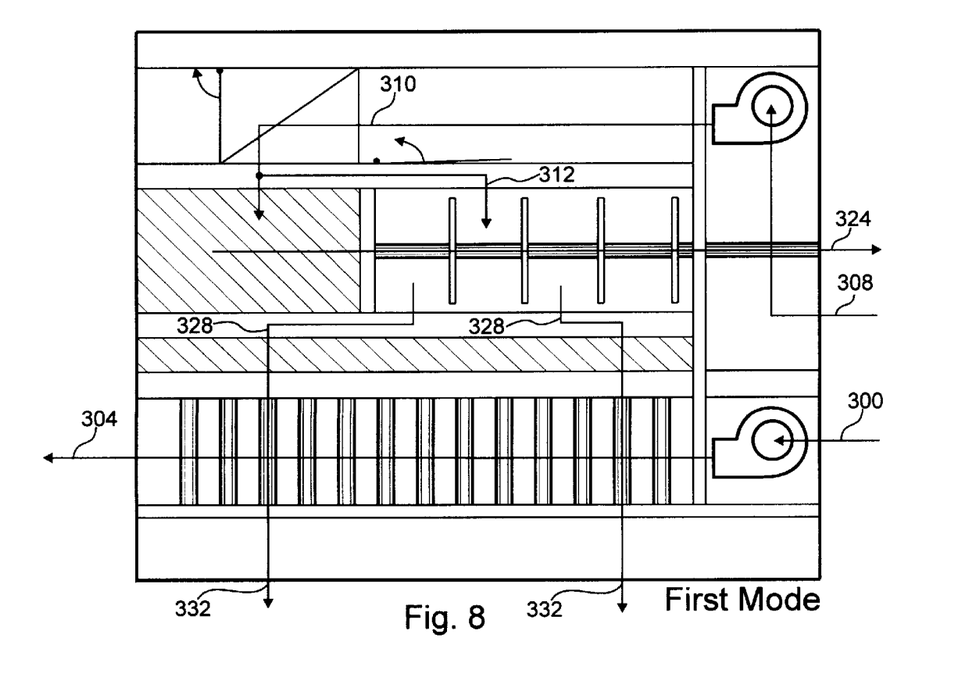
FIG. 8 is a side sectional view which schematically depicts air flow while operating in the first mode.
Figure 9:
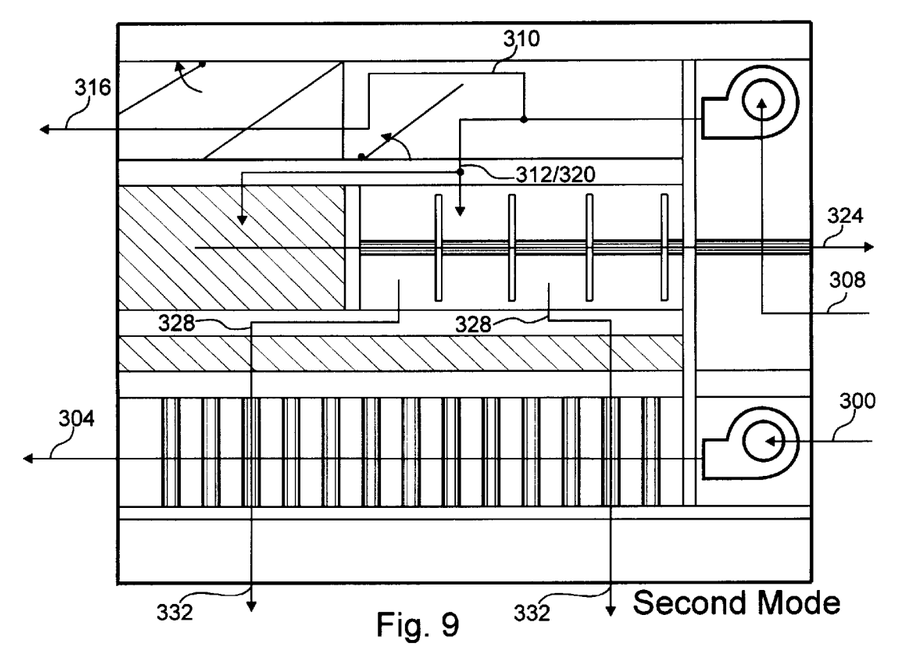
FIG. 9 is a side sectional view which schematically depicts air flow while operating in the second mode.
Figure 10:
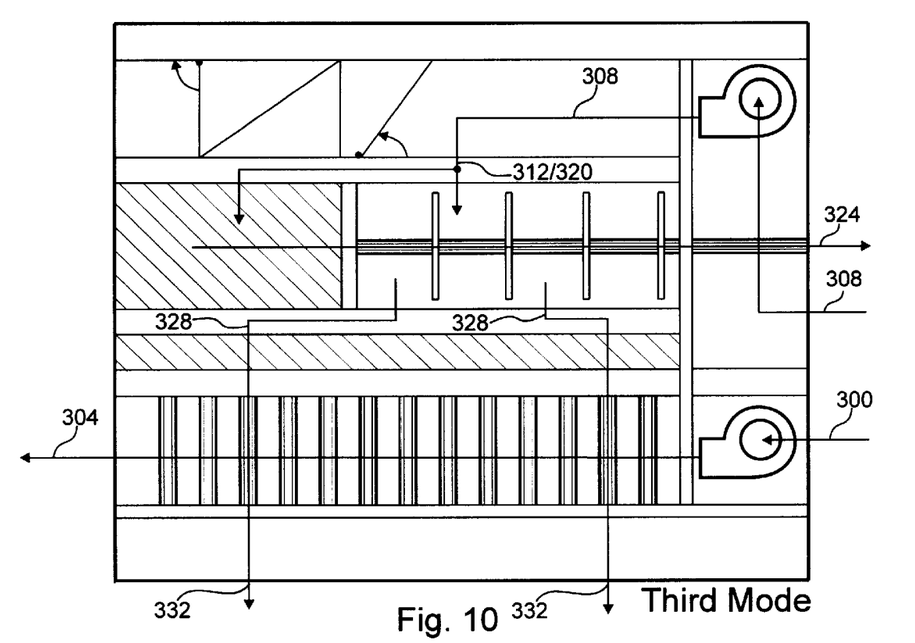
FIG. 10 is a side sectional view which schematically depicts air flow while operating in the third mode.

FIGS. 8–10 depict the air flow throughout the desiccant/evaporative cooling system dictated by the position of the first and second dampers 712, 716. These dampers 712, 716 allow operation of the system in the first through third modes respectively depicted in FIGS. 8–10. The first mode (see FIG. 8) uses both desiccant drying and evaporative cooling to condition the enclosed structure 372 by placing the first damper 712 in the horizontal position and the second damper 716 in the vertical position. To operate in the second or regeneration mode (see FIG. 9), the first damper 712 is positioned to allow the majority of the third airstream 308 to go directly to the first evaporative cooler 356 and avoid the desiccant chamber 352. In this mode, the desiccant is heated to evaporate the moisture therein and a small portion of the third airstream is used to exhaust the resulting airstream 316 past the second damper 716. Operation in the third or coasting mode (see FIG. 10) diverts all of the third airstream 308 such that the desiccant chamber 352 is avoided entirely. In the third mode, the humidity sensor 350 has indicated further drying of the air in the enclosed structure 372 is unnecessary.

The presently disclosed invention described herein includes provision to service or replace the moisture absorbing surfaces in the first and second indirect evaporative coolers 356, 360. An advantage of the presently disclosed desiccant/evaporative cooling system is its ease of serviceability. As can be seen in FIG. 7, the moisture absorbing surfaces of each indirect evaporative cooler 356, 360 are accessible from the portion of the system which faces the enclosed structure 372. This allows the occupants to easily remove and replace the absorbing surfaces without leaving their room. Conventional evaporative coolers often require climbing onto the roof of the enclosed structure 372 and further require elaborate disassembly to remove the absorbing surfaces.

Excess water may be provided to the moisture absorbing surfaces within the evaporative coolers 356, 360 such that heat transfer between the wet and dry sides of the heat exchangers is improved as the water passes, along with cooled air, through the heat exchangers. In the embodiment described in FIG. 7, excess water from the evaporative cooler 360 is recovered along with condensation in condensation collection pan 704. The condensation is generally cool which, when recycled to the evaporative coolers 356, 360 improves their efficiency.

In one embodiment, the invention is a self-contained cooling system configured as a window unit for cooling a room. The invention can stand alone for applications such as automotive cooling systems or duct work can be attached to the unit for larger residential or industrial applications. The desiccant/evaporative cooling system can be configured in a size comparable to that of vapor compression machinery with essentially equivalent cooling output (see FIG. 7). This mechanical configuration is considerably less complex than conventional Pennington cycle systems, eliminating the desiccant and enthalpy wheels in conventional systems and only requiring a relatively low power motor, or motors, to drive the fans 380, 380 and pump 368.

Contrary to the embodiment in FIG. 7, the desiccant chamber 352 and the indirect evaporative cooler components 356, 360 of the invention may also be constructed in separate housings that communicate through duct work, as needed for the particular application. The desiccant chamber 352 and multi-stage indirect evaporative coolers 356, 360 may also be configured as separate assemblies for air drying or air cooling applications or for use with other types of air conditioning equipment, such as vapor compression machinery.

Although the above discussion is generally limited to two stages of indirect evaporative cooling, those skilled in the art can appreciate the principles may be applied to systems with more than two stages of evaporative cooling. Further, the second airstream 304 may be additionally cooled by an indirect or direct evaporative cooler prior to entry into the enclosed structure 372.

Those skilled in the art will appreciate that the first stage indirect evaporative cooler 356 serves the function of rejecting the heat of adsorption generated in desiccant chamber 352. As such, alternative means of rejecting this heat, to include air to air heat exchangers or vapor compression equipment may be utilized in place of the first stage indirect evaporative cooler.

Additionally, as those skilled in the art can appreciate, embodiments of this system can provide energy efficient heating with essentially the same equipment by using the desiccant chamber 352 and heating source 392. The heating source 392 could include, but is not limited to, solar heaters, resistive elements, gas fuel combustion, liquid fuel combustion, thermal radiation, or microwave heaters.

The forgoing description of the invention has been presented for the purposes of illustration and description and is not intended to limit the invention. Variations and modifications commensurate with the above description, together with the skill or knowledge of the relevant art, are within the scope of the present invention. The embodiments described herein are further intended to explain the best mode known for practicing the invention and to enable those skilled in the art to utilize the invention in such best mode or other embodiments, with the various modifications that may be required by the particular application or use of the invention. It is intended that the appended claims be construed to include alternative embodiments to the extent permitted by the prior art.

What is claimed is:

1. A desiccant/evaporative cooling system for providing cool and dry air to an enclosed structure, comprising:

a desiccant chamber which receives and drys a first airstream removed from an enclosed structure to produce a second airstream;

at least one evaporative cooler, in communication with the desiccant chamber and which receives and cools the second airstream to produce a third airstream at a temperature below a dew point for an ambient airstream, the ambient airstream being located outside of the enclosed structure;

a gas removal system for removing the ambient airstream from the exterior of the enclosed structure;

a heat exchanger in communication with the gas removal system and which uses the third airstream for absorbing heat from the ambient airstream to produce a fourth airstream; and a gas introduction system in communication with the heat exchanger for forcing the fourth airstream into the enclosed structure, wherein condensate is removed from the ambient airstream within the heat exchanger.

2. The desiccant/evaporative cooling system of claim 1, wherein a desiccant within the desiccant chamber is intermittently regenerated to remove any moisture therefrom.

3. The desiccant/evaporative cooling system of claim 1, further comprising means for recycling the condensate for use in the at least one evaporative cooler.

4. The desiccant/evaporative cooling system of claim 1, wherein the at least one evaporative cooler comprises an indirect evaporative cooler which includes the heat exchanger and the heat exchanger is located on the dry side of the indirect evaporative cooler.

5. The desiccant/evaporative cooling system of claim 1, wherein the evaporative cooler is serviceable from within the enclosed structure.

6. The desiccant/evaporative cooling system of claim 1, wherein the desiccant/evaporative cooling system is free of desiccant wheels.

7. The desiccant/evaporative cooling system of claim 1, further comprising:
  means for redirecting the first airstream to operate the desiccant/evaporative cooling system in at least two modes, wherein:
    in a first mode, the first airstream is dried, and
    in a second mode, a material used to dry the first airstream is regenerated to remove moisture.

8. A method for conditioning an ambient airstream to provide cool and dry air to an enclosed structure, the ambient airstream being located outside the enclosed structure, comprising the steps of:
  removing an ambient airstream from a location outside an enclosed structure;
  cooling the ambient airstream to a point below the dew point of the ambient airstream which produces a first airstream which is cooler than the ambient airstream;
  forcing the first airstream into the enclosed structure;
  withdrawing a second airstream from the enclosed structure;
  drying the second airstream to produce a third airstream; and
  decreasing a temperature of the third airstream with one or more evaporative coolers to produce a fourth airstream, wherein the fourth airstream has a temperature lower than the dew point of the ambient airstream, wherein the cooling step includes the step of absorbing heat from the ambient airstream by using the fourth airstream and
  wherein moisture in the ambient airstream condenses during heat absorption.

9. The method for conditioning the ambient airstream of claim 8, wherein the cooling step is performed by at least one evaporative cooler.

10. The method for conditioning the ambient airstream of claim 8, further comprising the step of operating in a second mode which regenerates a desiccant used in the drying step.

11. The method for conditioning the ambient airstream of claim 8, further comprising the steps of:
  sensing a moisture content of the second airstream; and
  operating in a third mode which eliminates the drying step when the moisture content is below a predetermined value.

12. The method for conditioning the ambient airstream of claim 8, further comprising the steps of:
  sensing a moisture and a temperature within the structure; and
  reacting to the sensing step by modifying at least one of the moisture and the temperature.

13. The method for conditioning the ambient airstream of claim 8, further comprising the step of:

recycling condensation from the ambient airstream to provide liquid to the one or more evaporative coolers.

14. A desiccant/evaporative cooling system for providing cool and dry air to an enclosed structure, comprising:
  means for intermittently drying a first airstream withdrawn from the enclosed structure so that a temperature of the first airstream is below a dew point for an ambient airstream;
  means for withdrawing the ambient airstream from a location outside of the enclosed structure; means for cooling the first airstream withdrawn from the enclosed structure so that a temperature of the first airstream is equal to or less than the dew point for the ambient airstream, wherein the cooling means includes at least one evaporative cooler; and
  means for absorbing heat and moisture from the ambient airstream by using the first airstream which is cooler than the ambient airstream.

15. The desiccant/evaporative cooling system of claim 14, wherein the drying means includes a desiccant.

16. The desiccant/evaporative cooling system of claim 14, further comprising means for recycling the condensate for use in at least one evaporative cooler.

17. The desiccant/evaporative cooling system of claim 14, wherein the cooling means includes an indirect evaporative cooler.

18. The desiccant/evaporative cooling system of claim 14, wherein the absorbing heat means includes a heat exchanger.

19. The desiccant/evaporative cooling system of claim 14, further comprising:
  one or more dampers, and
  means for controlling the dampers to operate the desiccant/evaporative cooling system in at least two modes, wherein:
    a first mode drys the first airstream, and
    a second mode regenerates the drying means to remove moisture.

20. The method of claim 8, wherein the ambient airstream is not contacted with a desiccant prior to the ambient airstream's introduction into the enclosed structure.

21. The method of claim 8, wherein, before the cooling step, the ambient airstream has a higher temperature and humidity than the fourth airstream.

22. The method of claim 8, wherein, before the cooling step, the ambient airstream has a higher dew point than the fourth airstream.

23. A method for providing cool air to an enclosed structure, comprising:
  (a) removing a first airstream from the interior of the enclosed structure;
  (b) cooling the first airstream to provide a cooled airstream having a first temperature;
  (c) withdrawing an ambient airstream from a location outside of the enclosed structure;
  (d) transferring heat from the ambient airstream to the cooled airstream to form a cooled ambient airstream, wherein the ambient airstream has a dew point before the transferring step that is more than the temperature of the cooled airstream; and
  (e) introducing the cooled ambient airstream into the enclosed structure.

24. The method of claim 23, wherein the cooling step includes the steps of:
  contacting the first airstream with a desiccant to remove moisture from the first airstream and form a dried airstream;

contacting the dried airstream with a heat exchanger to remove at least a portion of the sensible heat from moisture adsorption in the prior contacting step and form a cooled dried airstream; and contacting the cooled dried airstream with one or more evaporative coolers to cool further the cooled dried airstream and form the cooled airstream.

25. The method of claim 24, wherein the contacting steps are performed discontinuously to permit regeneration of the desiccant.

26. The method of claim 23, wherein neither the ambient airstream nor the cooled ambient airstream is contacted with a desiccant prior to the cooled ambient airstream's introduction into the enclosed structure.

27. The method of claim 23, wherein, before the transferring step, the ambient airstream has a higher temperature and humidity than the cooled airstream.

28. The method of claim 23, wherein, before the transferring step, the ambient airstream has a higher dew point than the cooled airstream.

29. The method of claim 24, wherein in the transferring step at least a portion of the moisture in the ambient airstream condenses to form a condensate and further comprising the step of:

recycling condensation from the ambient airstream to provide liquid to the one or more evaporative coolers.

* * * * *